May 12, 1964  J. D. VAN SICKLE  3,132,700
FRAME FOR AGRICULTURAL IMPLEMENT
Filed July 3, 1961  2 Sheets-Sheet 1
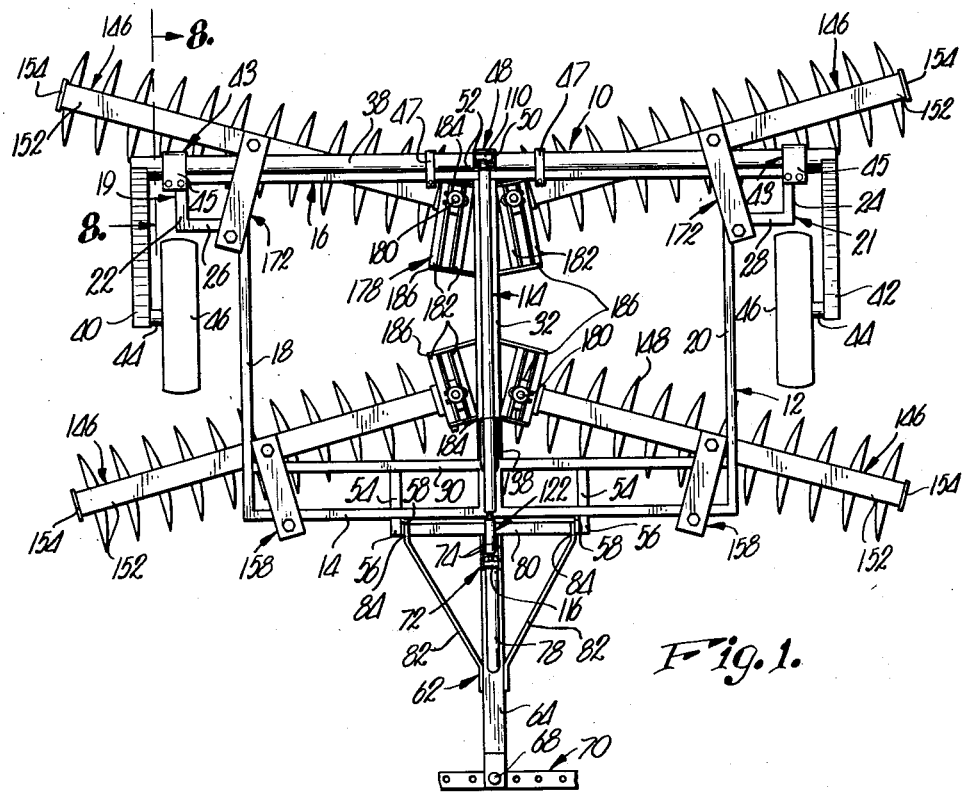
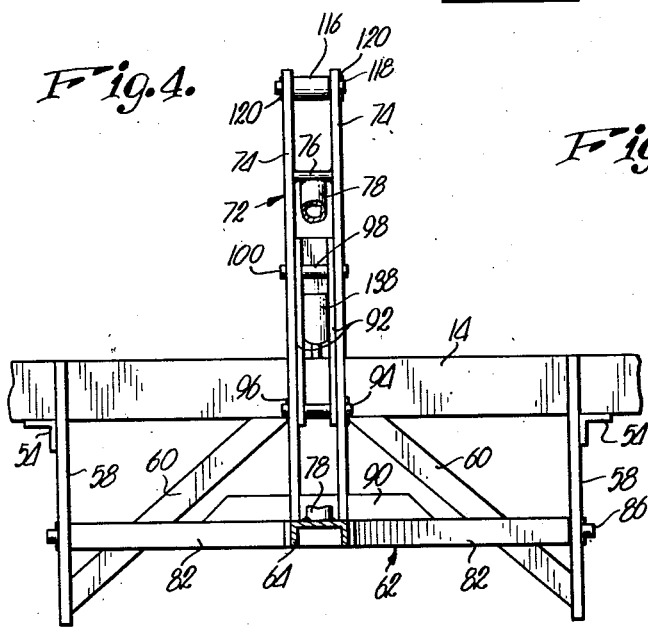
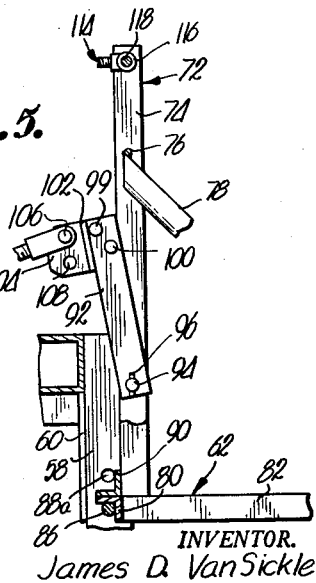
INVENTOR.
James D. Van Sickle
BY
Hovey, Schmidt, Johnson & Hovey
ATTORNEYS.

May 12, 1964 J. D. VAN SICKLE 3,132,700
FRAME FOR AGRICULTURAL IMPLEMENT
Filed July 3, 1961 2 Sheets-Sheet 2
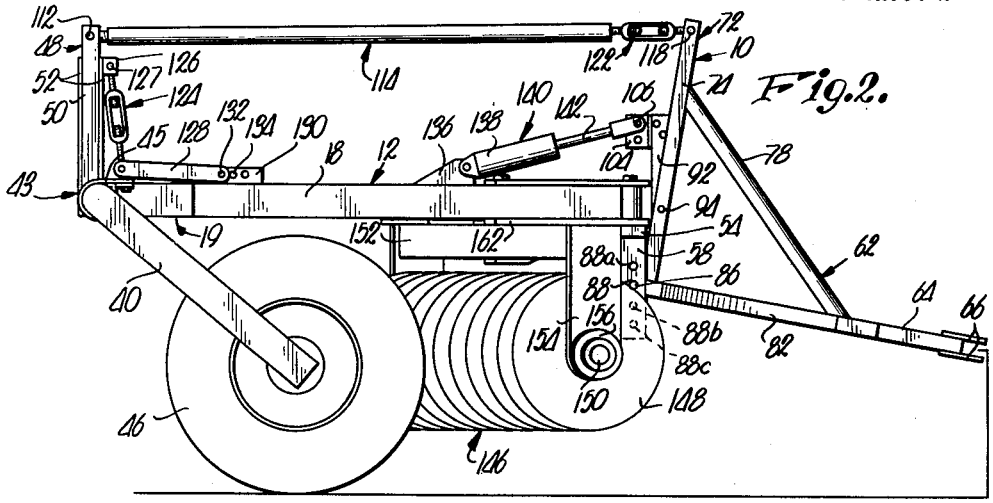
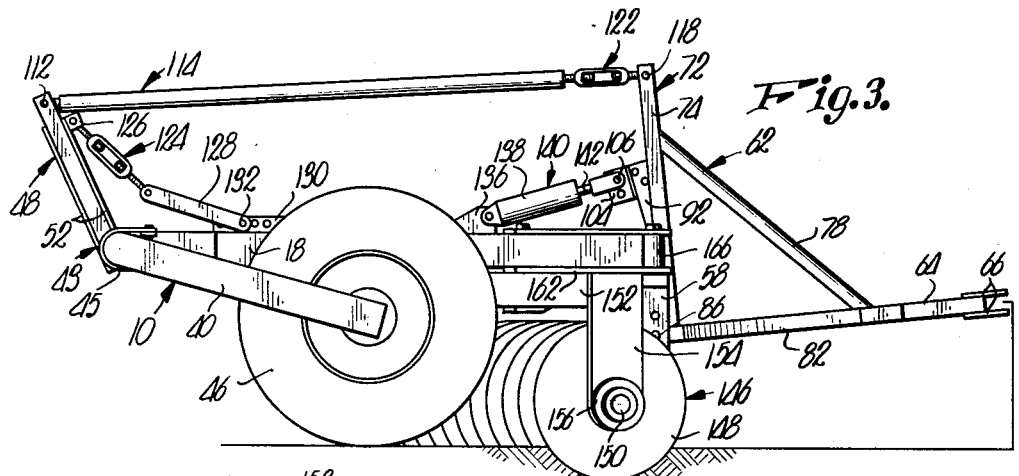
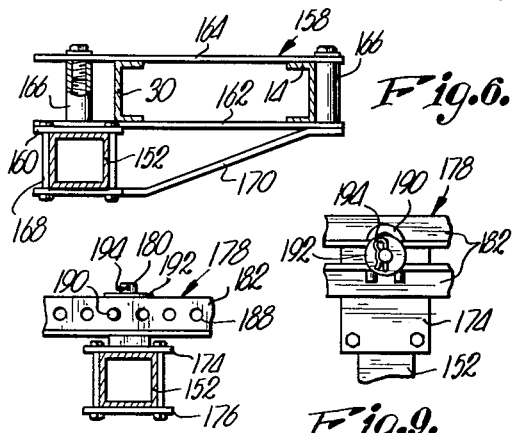
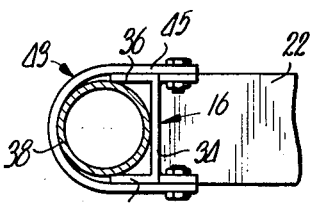
INVENTOR.
James D. VanSickle
BY
Hovey, Schmidt, Johnson & Hovey
ATTORNEYS.

United States Patent Office 3,132,700
Patented May 12, 1964

3,132,700
FRAME FOR AGRICULTURAL IMPLEMENT
James D. Van Sickle, Cawker City, Kans., assignor, by mesne assignments, to Richardson Manufacturing, Inc., Cawker City, Kans., a corporation of Kansas
Filed July 3, 1961, Ser. No. 121,758
2 Claims. (Cl. 172—407)

This invention relates to frames for agricultural implements, and more particularly to a frame adapted to carry a plurality of implements in horizontally spaced relationship with one another and in predetermined, vertical spaced relationship with respect to the surface of the ground. Heretofore, one of the difficulties experienced with implement frames of the general type referred to, has been the inability to provide for the even operation of all implements affixed to various parts of the frame, especially throughout the range of vertical settings required for various agricultural operations. If the implements were adjusted to operate uniformly at one depth setting, they would be moved out of proper horizontal alignment when an alternate depth setting was utilized. Similarly, during the shifting of conventional frames to place the implements into or out of engagement with the ground, the frames were not maintained in a horizontal position, thereby resulting in uneven implement operation.

Accordingly, it is the most important object of this invention to provide a frame for carrying a plurality of agricultural implements in substantially level positions regardless of the height at which the implements are carried with respect to the ground.

In connection with the aforementioned object, another equally important object of this invention is the provision of novel means for interconnecting the support for an implement frame, whereby the frame is maintained in a substantially horizontal position during vertical shifting thereof by the support.

Yet another important object of this invention is the provision of a frame having an adjusable hitch to accommodate various sized tractors without adversely affecting the even operation of the implements.

Still a further object of my invention is the provision of a frame having power means capable of allowing the implements to quickly assume any one of a variety of operating positions, yet capable of readily shifting the implements out of said positions and into positions for being transported.

A still further object of this invention is to provide adjustable means for limiting the extent of vertical shifting of the frame with respect to the ground, thereby providing a ready control for the maximum depth at which the implements operate, and a maximum height at which they are carried when not in use.

In the drawings:

FIGURE 1 is a plan view of the implement frame as contemplated by this invention, showing one form of implement attached thereto;

FIG. 2 is an enlarged, side elevational view of the frame of FIG. 1 illustrating the relative positions of the component parts when the frame is carrying the implements above the surface of the ground;

FIG. 3 is a view substantially similar to FIG. 2 illustrating the positions of the parts of the frame when the implements are supported in a position for tilling the soil;

FIG. 4 is an enlarged, fragmentary, front elevational view of the hitch with parts thereof broken away and shown in cross section to reveal details of construction and with parts of the frame and operating mechanism shown to illustrate the connection of the hitch with the frame;

FIG. 5 is an enlarged, fragmentary, side elevational view of the hitch and operating mechanism link with parts of the frame shown to illustrate the connection of the hitch with the frame and with parts of the hitch and frame broken away and shown in cross section to reveal details of construction;

FIG. 6 is a side elevational view on a still larger scale of the couplers provided for attaching a soil tilling tool to the implement frame, with parts of the tool and frame appearing in cross section for clearness;

FIG. 7 is an enlarged, fragmentary, elevational view of the adjustable retaining means for securing one end of a tillage implement to the frame;

FIG. 8 is an enlarged, fragmentary view taken along line 8—8 of FIG. 1 and showing one of the attaching means pivotally coupling the shaft to the frame; and FIG. 9 is an enlarged, fragmentary, plan view of the retaining means shown in FIG. 7.

Briefly, this invention relates to an implement frame comprising a normally horizontally disposed, generally rectangular frame unit adapted to carry a plurality of agricultural implements which may be releasably affixed thereto in horizontally spaced relationship with one another.

An L-shaped hitch is pivotally coupled to the front of the frame unit and comprises a generally horizontally disposed tongue adapted to be pivotally coupled at one end to the drawbar of a tractor in fixed spaced relationship with the surface of the ground, and an upstanding leg which is coupled by means of a rigid rod to a generally upstanding lever rigidly secured to a horizontal shaft, itself pivotally coupled to the rear of the frame unit. The rigidity of the rod, pivotally coupled at opposite ends to the lever and the leg, causes the shaft and the hitch to rotate the same amount and in the same direction about their axes of pivot with respect to the frame unit.

Power means which may be a fluid cylinder and piston assembly, is secured to the frame unit and the leg in position to rotate the hitch about the horizontal axis of its pivotal connection with the tractor. This rotation causes the end of the hitch, which is coupled to the frame unit, to move upwardly, thereby lifting the front of the unit. The simultaneous rotation of the shaft at the rear of the frame causes the swinging of a pair of spaced, parallel arms rigidly secured to and extending perpendicularly from the shaft, whereby a wheel carried on each arm is rotated into engagement with the ground. Continued rotation of the shaft causes the arms to impart vertical lifting movement to the rear of the frame unit. Inasmuch as the hitch and the shaft rotate together, the vertical shifting at the front and rear of the unit is substantially simultaneous and equal, thereby maintaining the horizontal disposition of the frame at all times.

The connection of the power means with the upstanding leg of the hitch, is through a swinging link coupled to the leg and the power means so that operation of the latter swings the link away from operational engagement with the leg and allows rotation of the shaft and the hitch in the opposite direction, resulting in lowering of the frame. Such lowering and raising of the frame may be utilized to move the implements carried thereby, into and out of engagement with the ground, or to various depths in the ground while maintaining all of the implements level at all times.

An agricultural implement frame broadly numerated 10, includes a frame unit 12 which may be constructed from steel channels and comprising a pair of horizontally spaced end members 14 and 16 interconnected adjacent either end by a pair of side members 18 and 20.

End member 16, disposed at the rear of unit 12, extends outwardly beyond side members 18 and 20 to form one side of each of a pair of projections 19 and 21 extending outwardly adjacent the rear and on either side of frame unit 12. Members 22 and 24 project forwardly from opposite ends of member 16 and are respectively connected to side members 18 and 20 by short members 26 and 28. A cross member 30 disposed near the front of frame unit 12 interconnects side members 18 and 20 and a member 32 connects front member 14 and back member 16.

Member 16 is of channel configuration, having a bight portion 34 and a pair of parallel flanges 36 disposed with the flanges extending to the rear as appears best in FIG. 8. A shaft 38 is disposed adjacent bight portion 34 and between the flanges 36 of member 16 and extends parallel thereto and outwardly from members 22 and 24 as is best shown in FIG. 1. Shaft 38 is pivotally coupled to member 16 by a pair of U-shaped connectors 43 having the arcuate portion thereof disposed around shaft 38 and the parallel legs 45 thereof bolted to members 22 and 24. A second pair of U-shaped connectors 47, located adjacent opposite sides and spaced horizontally from member 32 aid in pivotally coupling shaft 38 to member 16. It will be understood that shaft 38 is free to rotate in its position adjacent bight portion 34 and between flanges 36, but is maintained within the channel by the U-shaped connectors 43 and 47.

A pair of arms 40 and 42 are rigidly secured at either end of shaft 38, spaced horizontally outwardly from side members 18 and 20, and extend radially forwardly from shaft 38. Each arm 40 and 42 has an axle 44 extending perpendicular thereto and parallel to the longitudinal axis of shaft 38, and each axle journals a wheel 46 which may be equipped with a pneumatic tire, for rotation upon a respective axle 44.

A lever 48 is rigidly secured to and extends generally upwardly from shaft 38 and comprises a pair of essentially flat side plates 50 interconnected by a pair of end plates 52. Side plates 50 extend upwardly from shaft 38 further than do end plates 52, thereby resulting in a bifurcation adjacent the outer end of lever 48 for a purpose which will hereinafter be described.

A pair of horizontally spaced angle members 54 are disposed on either side of member 32 and are connected to and extend perpendicularly from front member 14 and member 30, continuing outwardly from front member 14 to provide a pair of forwardly extending projections 56 on frame unit 12. A pair of elements 58 are secured to the projections 56 adjacent the front face of member 14 and extend downwardly from members 54. Brace members 60 connect the lowermost ends of elements 58 with front member 14 and stabilize the elements 58.

A hitch broadly designated 62, includes a generally horizontally disposed, forwardly extending tongue member 64 provided at its outer end with a pair of rigidly secured, spaced plates 66 provided with aligned apertures 68 and adapted to be pivotally coupled to the drawbar 70 of a towing vehicle such as a tractor or the like. A substantially upright leg member 72 is rigidly secured to tongue member 64 adjacent the end thereof remote from plates 66 and includes a pair of spaced, opposed plates 74. A cross member 76, spaced from the outer ends of plates 74 interconnects the latter and is securely fastened to one end of a brace 78. The latter extends diagonally downwardly and has its other end rigidly secured to tongue member 64 intermediate the ends thereof for maintaining leg member 72 substantially upright with respect to tongue member 64 as appears in FIGS. 2 and 3. A crossbar 80, which may be formed from an angle iron, extends between the projections 58.

A pair of diagonal braces 82 interconnect respective ends of crossbar 80 with tongue 64 intermediate the ends of the latter, and are provided with rearwardly-extending flanges 84 disposed in abutting relationship with the inwardly facing flat surfaces of the elements 58. Aligned apertures are provided in each flange 84 for receiving a pin 86 which passes through the aligned apertures in braces 82 and extends through aligned apertures 88 provided in the downwardly directed elements 58, thereby pivotally coupling hitch 62 to frame unit 12. As is best shown in FIG. 2, the elements 58 are provided with a series of aligned apertures 88a, 88b and 88c so that the point of pivoting of hitch 62 with respect to frame unit 12 may be adjusted along the elements 58 by removing rod 86 from apertures 88 and replacing it through any of the pairs of aligned apertures 88a, 88b or 88c. An additional angle member 90, shorter in length than crossbar 80, is rigidly secured in back-to-back relationship with the latter adjacent the portion intermediate the outer ends thereof. The upstanding flange of member 90 is secured to plates 74 and lends additional stability to the interconnection of leg member 72 and tongue member 64.

A pair of plates 92 are positioned adjacent the inner faces of respective plates 74 of leg member 72 and are pivotally coupled to the latter by a pin 94 extending transversely through plates 92 and 74. A second pin 98 extends transversely through the plates 92 in spaced relationship along the latter from pin 94 and extends outwardly beyond the plates 74 to provide lugs 100 in position to engage the rear edge of the plates 74 as the plates 92 are swung about pin 94. Pin 98 is releasably secured in place by cotter pin means (not shown) so that it may be removed if desired, and inserted in an aperture 99 through plates 92 to permit plates 92 to swing further before lugs 100 engage member 72. A plate 102 is rigidly secured by welding or the like to the plates 92 adjacent the end thereof remote from pin 94 and on the edges of plate 92 remote from leg 72. Plate 102 extends outwardly beyond the plates 92 to be in position to engage member 72 if pin 98 is removed. A flange 104 is rigidly secured to the middle of plate 102 extending rearwardly therefrom, and is provided with an aperture adapted to receive a pin 106 and an aperture 108.

A tubular spacer 110 is pivotally journalled at the bifurcated portion of lever 48 by a pin 112 extending through aligned apertures in the outer ends of the plates 50. A rod 114, which may be of reduced diameter adjacent spacer 110 to facilitate pivotal movement of the latter, is rigidly connected to spacer 110 and ultimately, to a second connector 116 received between the plates 74 at the upper end of leg 72. Connector 116 is pivotally coupled to leg 72 by a pin 118 extending through aligned apertures in the upper end of leg 72.

A turnbuckle 122, comprising a portion of rod 114, is disposed between connector 116 and the major portion of rod means 114 to adjustably regulate the length of the rod 114 and thus, the distance between lever 48 and leg 72. A second turnbuckle 124 is pivotally coupled by means of pin 127 to a forwardly extending flange 126 which is rigidly secured to the front plate 52 of lever 48. The other end of turnbuckle 124 is pivotally coupled to a link 128 comprising a pair of spaced straps, the link 128 being in turn pivotally coupled to an upstanding flange 130, rigidly secured as by welding to member 32. The coupling of link 128 to flange 130 is by pin means 132 disposed through one of a series of horizontally disposed apertures 134 in flange 130.

Member 32 is provided with a second upstanding flange 136 spaced horizontally from the forward end thereof, which pivotally mounts the cylinder portion 138 of power means in the form of a fluid piston and cylinder assembly 140. The piston rod 142 of assembly 140 is bifurcated adjacent its outer end and is pivotally coupled to flange 104 by pin 106 extending through an aperture of flange 104 and aligned apertures in the bifurcated portion of rod 142.

Frame 10 is shown supporting four banks 146 comprising a plurality of horizontally spaced tillage wheels 148 which may be of the conventional disc configuration. The wheels 148 are journalled upon a shaft 150 and each bank is provided with a horizontally extending bar 152 maintained in spaced parallelism with shaft 150 by a plurality of vertical legs 154, each having a bearing 156 at the outer end thereof for allowing rotation of shaft 150 with respect to the legs 154. Each bar 152 of the front two banks 146 is bolted to a connector broadly designated 158 and best shown in FIG. 6.

Connector 158 includes a plate 160 having a forwardly extending strap 162 rigidly secured thereto. A second strap 164 overlies strap 162 and is maintained in spaced parallelism with the latter by a pair of spacers 166. Bottom strap 162 is rigidly secured to the spacers 166 and top strap 164 is releasably secured to the spacers 166 to permit connector 158 to be selectively disposed around members 14 and 30 as shown in FIG. 6. The connectors 158 are secured to respective bars 152 by bolt means 168 and are stabilized by brace member 170. As best appears in FIG. 1 the connectors 158 on each of the front banks of tillage wheels, are identical and are disposed over the members 14 and 30 between member 32 and the outer members 18 and 20 respectively, thus permitting limited pivoting of banks 146 with respect to frame 10.

Connectors 172, secured to the rear banks of wheels, identical to the connectors 158 provided for the front banks, are positioned over member 16 and the members 26 and 28 respectively on respective projections 19 and 21 at the rear of frame unit 12.

Each bar 152 is provided with a plate 174 overlying the end thereof proximate member 32 and rigidly secured to bar 152 by a second plate 176 bolted to plate 174. Adjustable connecting means for each bank 146 broadly designated 178, includes an upstanding stub shaft 180 rigidly secured to and extending upwardly from plate 174. The respective shafts 180 of each bank 146 are adapted to be received between a pair of angle members 182 disposed back-to-back. The members 182 for the front two banks 146, are held in spaced parallelism by a supporting member 184 secured to the front of the members 182 and to member 32, and a longer supporting member 186 secured to the rear of the members 182 and to member 32. The rear supporting members 186 are of sufficient length to cause the pairs of members 182 to diverge from member 32 as the rear of the members 182 is approached. The angle of divergence is selected to cause the leading edge of the innermost wheel 148 of a front bank 146 to travel parallel with the corresponding leading edge of the innermost wheel 148 of the adjacent bank 146 during shifting movement of the shafts 180 along the members 182. Likewise, the trailing edges of the innermost wheels 148 of the rear banks 146 move parallel when shifted.

Pairs of members 182 for each of the rearmost banks 146 are oppositely disposed with long member 186 securing the front end of the members 182 to member 32 and short member 184 secured to the rear of the members 182 so that such rear members 182 diverge as the front end thereof is approached. Similarly, the angle of divergence is such that the trailing edge of the innermost wheels 148 of respective rear banks 146 also move parallel with one another during reciprocation of shafts 180 along the members 182.

A series of aligned apertures 188 in the upstanding flanges of angle members 182, provide means for releasably securing the shafts 180 at a predetermined position with respect to the members 182. The positioning means includes a U-shaped pin 190 adapted to be inserted to straddle a respective shaft 180 and may be held in place by cotter pin means (not shown). A washer 192 on each shaft 180 and releasably retained in place by cotter pin 194, engages the upstanding flanges of members 182 and lends vertical support to the banks 146.

The angle of all of the banks 146 may be increased by shifting the shafts 180 along the respective members 182. Conversely, the angle may be selectively decreased by movement in the opposite directions.

In operation, the implement frame 10 has one, or a plurality of agricultural implements secured thereto, and the implements may be in the nature of the banks 146 which have been shown and described. On the other hand, there is no intention to limit the usefulness of frame 10 to the purpose of supporting the type of tillage wheels illustrated, but the frame may be equally advantageously employed with any one of a number of conventional agricultural implements.

The plates 66 at the outer end of tongue 64 are pivotally connected to the drawbar 70, shown only in FIG. 1, of a tractor or the like. Fluid is then introduced into the cylinder 138 of the assembly 140, thereby causing the piston to extend the piston rod 142 in the conventional manner. The extending of rod 142 swings the plates 92 about their point of pivot with respect to leg 72, which point of pivot is around pin 94. The lugs 100 engage the rear edge of plates 74, thereby pushing leg 72 of hitch 62 forwardly. If it is desired, due to differences in the stroke of different assemblies 140, pin 98 may be positioned in aperture 99 to vary the distance of swing of the plates 92 before the lugs 100 engage the plates 74. Additionally, pin 98 may be removed entirely, thus further varying the distance by allowing plate 102 to engage the rear edge of plates 74 to push leg 72.

Inasmuch as the drawbar 70 of the tractor is positioned in fixed spaced relationship from the surface of the ground, leg 72, rigid with tongue 64, causes the latter to pivot through a vertical plane about the point of connection of plates 66 with drawbar 70. This in turn raises the opposite end of tongue 64, causing the latter to pivot about pin 86 connected to the leg elements 58. The raising of the end of tongue 64 likewise lifts the elements 58 and shifts the forward part of frame unit 12 upwardly. At the same time, the forward movement of leg 72 pulls lever 48 forwardly inasmuch as leg 72 and lever 48 are interconnected by the rigid rod 114. The forward movement of lever 48, rigid with shaft 38, rotates the latter about its horizontal axis and causes the arms 40 and 42 to swing downwardly. The tires on wheels 46, journalled at the outer ends of the arms 40 and 42, engage the surface of the ground and the continued rotation of shaft 38 forces the rear portion of frame unit 12 upwardly. Inasmuch as the spacing between legs 72 and lever 48 is fixed, due to the rigidity of rod 114, the downward movement of arms 40 and 42 will correlate with the upward movement of the end of tongue 64. Thus, assuming proper adjustment of turnbuckle 122 to provide for the proper horizontal spacing of lever 48 from leg 72, frame unit 12 is maintained in substantially horizontal relationship throughout the vertical shifting thereof. The vertical shifting of frame 12 may be properly correlated with the extensibility of piston rod 142 so that the shaft 38 rotates sufficiently far for the implements supported by frame unit 12 to be carried clear of the ground. This position, with the wheels 46 supporting the frame 10 and the tillage implements, is ideally suited for transporting the implements from one working position to another.

When it is desired to place the implements into engagement with the ground, actuation of the fluid piston and cylinder assembly 140 so that piston rod 142 is withdrawn within cylinder 138 swings the plates 92 so that the lugs 100 are withdrawn from engagement with the rear edge of the plates 74 of leg 72. The inherent weight of the frame itself, added to the weight of the implements carried thereby, causes the frame and implements to be lowered toward the ground. Inasmuch as the lugs 100 are not in contact with the rear edge of leg 72, there is no support for the arms 40 and 42 through rod 114, lever 48 and shaft 38. Therefore, the arms 40 and 42 are allowed to swing upwardly as leg 72 is drawn rearwardly by such swinging movement. Here again, it is evident that the swinging of leg 72 to the rear pivots tongue 64 in a vertical arc around its point of connection with drawbar 70 of the tractor. This lowers the end of tongue 64 adjacent frame unit 12 and in turn allows the front portion of frame unit 12 to be shifted downwardly. The rigid connection of leg 72 with lever 48 insures that arms 40 and 42 will be swung upwardly in direct relationship with the pivoting of tongue 64 downwardly, and the rear of frame unit 12 is lowered in exact correlation with the lowering of the front portion thereof. Thus, the frame unit 12 is maintained in horizontal relationship throughout the shifting upwardly and shifting downwardly thereof.

Inasmuch as it is desirable to have the tillage implements supported by frame 10 to operate at a given, preselected depth with respect to the surface of the soil, this relationship may be provided by the amount of extension of piston rod 142 from cylinder 138. Most tractors are equipped with suitable fluid supply apparatus, whereby the position of the piston with respect to the cylinder of such power assemblies may be accurately controlled by proper operation of the tractor. However, inasmuch as some tractors are not so equipped, a suitable depth may be predetermined and provided for by proper adjustment of turnbuckle 124.

By viewing FIGS. 2 and 3, it will be obvious that lever 48 can swing rearwardly only until turnbuckle 124 and link 128 are in their extended positions. Inasmuch as turnbuckle 124 and link 128 limit the extent of rearward swinging of lever 48, they in turn limit the rotation of shaft 38 and the upward swinging of arms 40 and 42. By proper positioning of link 128 in one of the apertures 134 along flange 130, and adjusting turnbuckle 124, any of a variety of maximum vertical positions may be obtained for wheels 46. The lowering of frame unit 12 is dependent upon the vertical position of wheels 46 and the depth to which the implements carried by the frame 12 is thus positively controlled.

It should be noted that because frame unit 12 is maintained in a horizontal position throughout the entire vertical shifting thereof, the adjustment from one intermediate vertical position to another, will maintain the implements supported thereby in level operating conditions. Additionally, all of the implements are caused to engage the surface of the ground at the same time and all are withdrawn therefrom when the frame unit 12 is shifted to its uppermost position.

It should be noted that the coupling of power means 140 to leg 72 is such that lost motion occurs through the swinging of plates 92 when piston rod 142 is withdrawn from its extended position. In addition to the fact that the weight of the frame 10 obviates the necessity for power for lifting wheels 46, this lost motion prevents damage to turnbuckle 124 and link 128 which might be caused by too long a withdrawal stroke of power means 140 if a positive connection existed between the latter and leg 72. Also, the adjustability to provide for varying stroke lengths of certain power means 140 (previously mentioned) is possible because of such lost motion. Additionally, the lost motion connection allows for flexibility when the vehicle that is towing frame 10 goes over a ridge or the like, pulling the forward end of tongue 64 downwardly. Since leg 72 may swing forwardly from power means 140, there is no additional stress imparted to hitch 62 and the front banks 146 are not forced more deeply into the soil.

Having thus described the invention, what is claimed as new and desired to be secured by Letters Patent is:

1. In a frame for an agricultural implement, a generally horizontal frame unit adapted to carry said implement; an L-shaped hitch pivotally coupled to said frame for rotation about a generally horizontal axis, said hitch having a normally horizontally disposed first member adapted to be pivotally coupled at one end to the drawbar of an implement towing vehicle in predetermined spaced relationship with the surface of the ground, and including an upstanding second member rigidly secured to and extending radially outwardly from the axis of pivot of said hitch relative to said frame unit and angularly spaced from said first member; a generally horizontally disposed shaft pivotally coupled to said frame for rotation about an axis parallel to and spaced horizontally from the axis of rotation of said hitch relative to said frame unit; a pair of parallel, horizontally spaced arms rigidly secured to said shaft; a wheel mounted on each of said arms for rotation about parallel axes and in positions to engage the surface of the ground and lift said frame unit when said shaft is rotated in one direction; a lever rigidly secured to and extending radially outwardly from said shaft, said lever being disposed at an angle with respect to said arms; a rigid rod pivotally coupled to said lever and said upright member at points spaced radially from the axes of rotation of said shaft and the hitch; a link pivotally coupled to said second member for swinging through an arc behind the latter; lug means on said link and disposed to engage the second member for swinging the hitch with the link when the latter is swung in one direction, the hitch being free to swing in said one direction independently of said link; and power means coupled to the frame unit rearwardly of said hitch and to the link for swinging the latter to swing said hitch for effecting the raising or lowering of said frame unit responsive to the direction of swinging of said link.

2. Apparatus as set forth in claim 1 wherein said link includes a pair of parallel bars pivotally coupled to either side of said second member and to said power means, and the lug means includes a rod carried by said bars and extending therebetween in disposition to engage the second member for swinging the latter when the bars are swung in said one direction.

References Cited in the file of this patent

UNITED STATES PATENTS

| | | |
|---|---|---|
| 1,247,017 | Sharp | Nov. 20, 1917 |
| 2,464,615 | Sawall | Mar. 15, 1949 |
| 2,691,930 | Forgy | Oct. 19, 1954 |
| 2,767,538 | Scheidenhelm | Oct. 23, 1956 |
| 2,800,757 | Tufford | July 30, 1957 |